(12) United States Patent
Terada et al.

(10) Patent No.: US 8,808,942 B2
(45) Date of Patent: Aug. 19, 2014

(54) ADHESIVE FOR FUEL CELL AND MEMBRANE-ELECTRODE ASSEMBLY PRODUCED USING THE SAME

(75) Inventors: Satoru Terada, Saitama (JP); Hiroshi Sohma, Saitama (JP); Kenichi Tanaka, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 965 days.

(21) Appl. No.: 12/712,739

(22) Filed: Feb. 25, 2010

(65) Prior Publication Data

US 2010/0221638 A1 Sep. 2, 2010

(30) Foreign Application Priority Data

Mar. 2, 2009 (JP) .................................. 2009-047981

(51) Int. Cl.
| | | |
|---|---|---|
| *H01M 8/02* | (2006.01) | |
| *C09J 183/12* | (2006.01) | |
| *H01M 8/10* | (2006.01) | |
| *C08G 77/12* | (2006.01) | |
| *C08G 77/24* | (2006.01) | |
| *H01M 4/88* | (2006.01) | |
| *C08G 77/46* | (2006.01) | |

(52) U.S. Cl.
CPC ............. *H01M 8/0297* (2013.01); *C08G 77/12* (2013.01); *C08G 77/24* (2013.01); *H01M 4/8807* (2013.01); *C09J 183/12* (2013.01); *H01M 8/1004* (2013.01); *H01M 4/881* (2013.01); *Y02E 60/521* (2013.01); *H01M 8/0284* (2013.01); *C08G 77/46* (2013.01)
USPC ............ 429/483; 429/469; 429/482; 524/547

(58) Field of Classification Search
CPC H01M 8/0276; H01M 8/0284; H01M 8/0286
USPC ................ 528/31, 32, 42; 429/483, 469, 482; 524/547
See application file for complete search history.

(56) References Cited

U.S. PATENT DOCUMENTS 6,201,092 B1 * 3/2001 Hara ................................ 528/32
7,195,838 B2  3/2007 Nanaumi et al.
(Continued)

FOREIGN PATENT DOCUMENTS

| JP | 2003-068323 A | 3/2003 |
|---|---|---|
| JP | 2005-209605 A | 8/2005 |
| JP | 2008-112639 A | 5/2008 |

OTHER PUBLICATIONS

Koshikawa et al, "Perfluoroether elastomer for wide fluid and temperature capabilities", Jun. 2006, Sealing Technology, vol. 6, Issue 6, pp. 7-12.*

*Primary Examiner* — Milton I Cano
*Assistant Examiner* — Jimmy K Vo
(74) *Attorney, Agent, or Firm* — Westerman, Hattori, Daniels & Adrian, LLP (57) ABSTRACT

An adhesive suitable for solid polymer fuel cells is provided that has sufficient bond durability, so that the solid polymer electrolyte membrane and the gas diffusion layer do not separate, even with the solid polymer electrolyte fuel cell repeatedly wetting and drying, and changing in dimension. An adhesive including a base compound, a cross-linking agent, an adhesion promoting agent, and a reaction catalyst is employed using a specific base compound having alkenyl groups, and a specific cross-linking agent having Si—H groups, in which the ratio of moles of the above Si—H group relative to moles of the above alkenyl group (moles of Si—H group/moles of alkenyl group) is adjusted to the range of 1.0 to 5.0.

7 Claims, 5 Drawing Sheets

(56) References Cited

U.S. PATENT DOCUMENTS

2003/0049518 A1* 3/2003 Nanaumi et al. ............... 429/44
2005/0038217 A1* 2/2005 Ahn et al. ................ 528/15
2005/0043480 A1* 2/2005 Osawa ..................... 524/862
2005/0142397 A1 6/2005 Wakahoi et al.

* cited by examiner

ADHESIVE FOR FUEL CELL AND MEMBRANE-ELECTRODE ASSEMBLY PRODUCED USING THE SAME

This application is based on and claims the benefit of priority from Japanese Patent Application No. 2009-047981, filed on 2 Mar. 2009, the content of which is incorporated herein by reference.

BACKGROUND OF THE INVENTION

1. Field of the Invention

The present invention relates to an adhesive for fuel cells and membrane-electrode assembly produced using the same.

2. Related Art

In recent years, fuel cells have been greatly anticipated to be a means for curbing global warming and environmental destruction, and additionally to be a next-generation system for electric power generation, and thus research and development have been extensively carried out. Fuel cells generate energy by an electrochemical reaction of hydrogen and oxygen, and examples thereof include phosphoric acid fuel cells, molten carbonate fuel cells, solid electrolyte fuel cells, solid polymer fuel cells, and the like. Among these, solid polymer fuel cells have drawn attention as power sources for automobiles (two wheeled, four wheeled, etc.), portable electric power sources and the like, since they can be driven even at ordinary temperatures and have high output powers and compact size.

In solid polymer fuel cells, a fuel gas supplied on an anode side electrode, for example, a gas containing mainly hydrogen (hereinafter, also referred to as "hydrogen-containing gas") moves to a cathode side electrode side through a solid polymer electrolyte membrane after hydrogen is ionized on the electrode catalyst. Electrons generated during this process are taken out into an external circuit, and utilized as electric energy in DC. It should be noted that, since oxidizer gas, for example, air or a gas mainly containing oxygen (hereinafter, also referred to as "oxygen-containing gas") is supplied to the cathode side electrode, hydrogen ions, electrons and oxygen react on the cathode side electrode, whereby water is generated.

According to the membrane-electrode assembly in the aforementioned solid polymer fuel cells, a configuration in which a solid polymer electrolyte membrane, and an anode side electrode and a cathode side electrode are provided to have the same outside dimensions (hereinafter, referred to as "first configuration"), as well as a configuration in which the aforementioned solid polymer electrolyte membrane has an outside dimension greater than the outside dimensions of the anode side electrode and the cathode side electrode (hereinafter, referred to as "second configuration") have been employed.

Incidentally, in attempts to reduce the overall size of the fuel cell described above, decreasing the membrane thickness of the solid polymer electrolyte membrane that configures the membrane-electrode assembly has been desired. However, in the aforementioned first configuration, the end face position of the solid polymer electrolyte membrane matches with the end face positions of the anode side electrode and the cathode side electrode, and thus the fuel gas supplied to the anode side electrode and the oxidizer gas supplied to the cathode side electrode may indirectly go around from the end face of the solid polymer electrolyte membrane, which may result in mixing. In addition, a problem has been indicated in that short circuiting may be likely to occur between the end faces of the anode side electrode and the cathode side electrode. Furthermore, in the second configuration described above, the strength of a portion of the solid polymer electrolyte membrane sticking out from the end faces of the anode side electrode and the cathode side electrode is likely to be lowered, and thus, there arises a problem in that the solid polymer electrolyte membrane is more easily broken.

Figure 5:
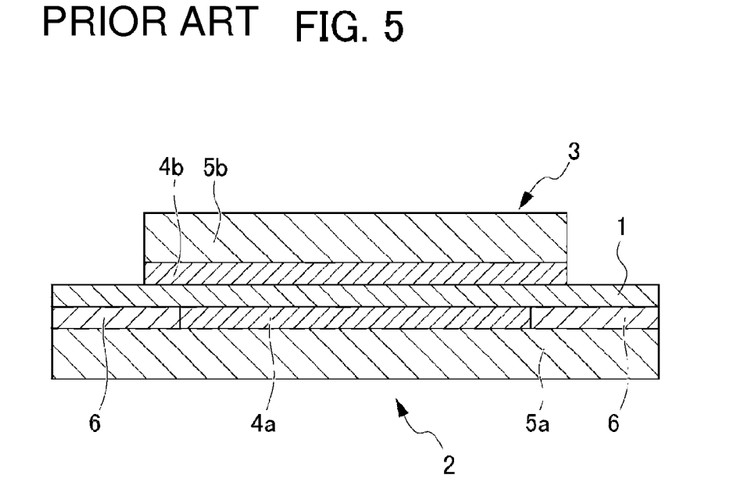
FIG. 5 shows a cross-sectional view illustrating the solid polymer type membrane-electrode assembly disclosed in Patent Document 1.

Consequently, the membrane-electrode assembly disclosed in Patent Document 1 has been known, for example. In Patent Document 1, a gas diffusion electrode layer 2 is provided on one surface of a solid polymer electrolyte membrane 1 to cover this surface, and on another surface of the solid polymer electrolyte membrane 1 is provided a gas diffusion electrode layer 3 having a surface area smaller than that of this other surface, as shown in FIG. 5. The gas diffusion electrode layers 2 and 3 have catalyst layers 4a and 4b that are in contact with two surfaces of the solid polymer electrolyte membrane 1, and gas diffusion layers 5a and 5b. The catalyst layers 4a and 4b are designed to have different dimensions from one another. An adhesion layer 6 is provided at a periphery of the catalyst layer 4a, and the gas diffusion electrode layer 2 is integrated with the solid polymer electrolyte membrane 1.

Moreover, the fuel cell disclosed in Patent Document 2 has been known as a solid polymer fuel cell having an adhesion layer. The fuel cell disclosed in Patent Document 2 is characterized by having a mixed layer in which a catalyst layer and an adhesion layer are present together on locations along the circumference of the catalyst layer. According to the fuel cell disclosed in Patent Document 2, the solid polymer electrolyte membrane is prevented from being damaged by avoiding formation of a distinct boundary between the catalyst layer and the adhesion layer.

In addition, an exemplary adhesive for fuel cells studied with regard to use in producing fuel cells is disclosed in Patent Document 3. When the adhesive for fuel cells disclosed in Patent Document 3 is used, curing can reportedly be ensured, irrespective of the adherend. However, bond durability is not satisfactory, and further improvement has been demanded.

PRIOR ART DOCUMENTS

Patent Documents

Patent Document 1: Japanese Unexamined Patent Application, First Publication No. 2003-68323
Patent Document 2: Japanese Unexamined Patent Application, First Publication No. 2005-209605
Patent Document 3: Japanese Unexamined Patent Application, First Publication No. 2008-112639

SUMMARY OF THE INVENTION

Problems to be Solved by the Invention

As in the foregoing, a solid polymer fuel cell including an adhesion layer provides high performance by sufficiently bonding and integrating the gas diffusion layers and the solid polymer electrolyte membrane. Incidentally, the gas diffusion layers have a role of maintaining sandwiching of the solid polymer electrolyte membrane from both sides. As a result, an adhesive is preferably used in joining the gas diffusion layers with the solid polymer electrolyte membrane, whereby the gas diffusion layers are reportedly able to maintain sufficient sandwiching of the solid polymer electrolyte membrane. In addition, it has been known that the solid polymer electrolyte fuel cell changes in dimension due to repeated wetting and drying. Consequently, if an adhesive having high bond durability is not used, the gas diffusion layer and the solid polymer electrolyte membrane separate, and the performance of the solid polymer fuel cell declines ultimately. Therefore, an adhesive having higher bond durability and suitable for solid polymer fuel cells has been demanded.

The present invention has been made to solve the above problems, and an object thereof is to provide an adhesive having sufficient bond durability and that can manufacture a membrane-electrode assembly without separation of the solid polymer electrolyte membrane and gas diffusion layer, even if the dimensions thereof change due to the solid polymer electrolyte membrane repeatedly wetting and drying.

Means for Solving the Problems

The present inventors have thus thoroughly researched in order to solve the above problems. Consequently, it was found that the above problems can be solved by an adhesive including a base compound, a cross-linking agent, an adhesion promoting agent and a reaction catalyst, provided that a specific base compound having alkenyl groups, and a specific cross-linking agent having Si—H groups are used, and that the ratio of moles of the above Si—H group relative to moles of the above alkenyl group is adjusted to fall within a specific range, thereby accomplishing the present invention. More specifically, the present invention provides the following.

According to a first aspect, in an adhesive for fuel cells used in producing a membrane-electrode assembly of a fuel cell, the adhesive includes: a base compound having a structure represented by the following general formula (1); a cross-linking agent having a structure represented by the following general formula (2); an adhesion promoting agent; and a reaction catalyst, in which a ratio of moles of Si—H groups contained in the cross-linking agent relative to moles of alkenyl groups contained in the base compound (moles of Si—H group/moles of alkenyl group) is 1.0 to 5.0.

(1)

In the formula (1), n represents an integer of 20 to 900.

(2)

In the formula (2), x and y satisfy 10≤x+y≤900.

According to a second aspect, in the adhesive for fuel cells according to the first aspect, the adhesion promoting agent has a structure represented by the following general formula (3).

$X_{3-n}Me_n$-Si—R—Y (3)

In the formula (3), X represents at least one group selected from the group consisting of a methoxy group, an ethoxy group, and a 2-methoxyethoxy group; Me represents a methyl group; R represents at least one group selected from the group consisting of an ethylene group and a propylene group; Y represents at least one group selected from the group consisting of an amino group, a vinyl group, a methacrylic group, an isocyanate group, a mercapto group, a ureido group and an epoxy group; and n is 0 or 1.

According to a third aspect, in the adhesive for fuel cells according to the first or second aspect, the ratio of moles of Si—H groups contained in the cross-linking agent relative to moles of alkenyl groups contained in the base compound (moles of Si—H group/moles of alkenyl group) is 1.2 to 5.0.

According to a fourth aspect, in a membrane-electrode assembly for a solid-polymer fuel cell, the assembly includes: a solid polymer electrolyte membrane; a catalyst layer provided on at least one surface of the solid polymer electrolyte membrane; a gas diffusion layer provided on the catalyst layer; an adhesive layer provided at a periphery of the catalyst layer, and joining the solid polymer electrolyte membrane and the gas diffusion layer, in which the adhesive layer contains the adhesive for fuel cells according to any one of the first to the third aspects.

Effects of the Invention

According to the first aspect of the invention, a specific base compound having alkenyl groups, and a specific cross-linking agent having Si—H groups are used, and the ratio of moles of the Si—H groups relative to moles of the alkenyl groups is adjusted to the range of 1.0 to 5.0. By thus bonding a gas diffusion layer with a solid polymer electrolyte membrane with the adhesive for fuel cells, the bond durability of the adhesive layer formed between the gas diffusion layer and the solid polymer electrolyte membrane can be improved.

According to the second aspect of the invention, by using the adhesion promoting agent having a specific structure, adhesive force between the solid polymer electrolyte membrane and the adhesive layer can be strengthened through a chemical bond, and thus the formed adhesive layer will have higher bond durability.

According to the third aspect of the invention, by adjusting the ratio of moles of the Si—H groups relative to moles of the alkenyl groups to 1.2 to 5.0, the amount of heat required for curing of the adhesive for fuel cells is decreased, and thus the influences from the heat applied to the solid polymer electrolyte membrane during production of the membrane-electrode assembly can be suppressed.

According to the forth aspect of the invention, adhesiveness between the solid polymer electrolyte membrane and the gas diffusion layer is increased, and thus separation of the solid polymer electrolyte membrane and the gas diffusion layer during use can be prevented.

DETAILED DESCRIPTION OF THE INVENTION

Modes for carrying out the present invention are explained below.

Adhesive for Fuel Cells

The adhesive of the present invention is an adhesive for fuel cells including a base compound having a structure represented by the following general formula (1); a cross-linking agent having a structure represented by the following general formula (2); an adhesion promoting agent; and a reaction catalyst, in which the base compound employed has alkenyl groups, and the cross-linking agent employed has Si—H groups. Furthermore, the adhesive for fuel cells of the present invention is characterized by having the ratio of moles of the Si—H groups relative to moles of the alkenyl groups adjusted to the range of 1.0 to 5.0.

The base compound included in the adhesive for fuel cells of the present invention has a structure represented by the following general formula (1). Furthermore, the cross-linking agent included in the adhesive for fuel cells of the present invention has a structure represented by the following general formula (2).

(1)

In the formula (1), n represents an integer of 20 to 900.

(2)

In the formula (2), x and y satisfy $10 \leq x+y \leq 900$.

Since solid polymer electrolyte membranes generally have sulfone groups and release acid components (a sulfuric acid component), it is preferred that an adhesive layer having high acid resistance can be formed. The reason is that the adhesive layer formed with the adhesive for fuel cells is directly bonded to the solid polymer electrolyte membrane, and is thus exposed to strong acidity. Since the adhesive for fuel cells of the present invention contains fluorine in the base compound as described above, the adhesive layer formed using the adhesive for fuel cells of the present invention has high chemical resistance. As a result, even though the adhesive layer is in contact with the solid polymer electrolyte membrane, the adhesive layer is not significantly influenced by the acid eluted from the solid polymer electrolyte membrane.

In the adhesive for fuel cells of the present invention, the ratio of moles of the Si—H groups relative to moles of the alkenyl groups (moles of Si—H group/moles of alkenyl group) is adjusted to the range of 1.0 to 5.0. Furthermore, by adjusting the ratio of moles of Si—H groups relative to moles of alkenyl groups preferably to the range of 1.2 to 5.0, the amount of heat required for curing of the adhesive for fuel cells is decreased, and influences from the heat applied to the solid polymer electrolyte membrane during production of the membrane-electrode assembly can be suppressed.

When the alkenyl group is left in the adhesive layer after curing, the double bond site may be cleaved in a time dependent manner. Consequently, the adhesive layer is cured, and thus bond durability of the adhesive layer is lowered. Therefore, it is necessary to increase the number of Si—H groups in the cross-linking agent such that the alkenyl group is not left in the adhesive layer after curing. Accordingly, the aforementioned molar ratio (moles of Si—H group/moles of alkenyl group) is adjusted to be no less than 1.0. Preferably, the molar ratio is adjusted to be no less than 1.2. Moreover, when the Si—H group is excessively left in the adhesive layer after the curing reaction, it does not affect deterioration of the adhesive layer as greatly as in the case of the alkenyl group. Therefore, when the molar ratio is adjusted to no less than 1.0, the adhesive layer is negligibly deteriorated and bond durability of the adhesive layer is not significantly affected, even if the Si—H group is left in the adhesive layer after curing. However, since the Si—H group is a functional group having reactivity, if Si—H groups remain excessively in the adhesive layer after curing, a coupling reaction with the Si—H groups remaining after the curing reaction will lead to hardening, thereby affecting bond durability of the adhesive layer. In order to prevent such detrimental effects due to the Si—H group excessively remaining in the adhesive layer after curing, the aforementioned molar ratio should be adjusted to no greater than 5.0.

With respect to a reaction between the base compound and the cross-linking agent, a reaction system not generating a by-product may be exemplified by an addition reaction system by means of a platinum catalyst. Therefore, the reaction catalyst used in the adhesive for fuel cells of the present invention is preferably a platinum catalyst.

Examples of the platinum catalyst include platinum black, platinic chloride, chloroplatinic acid, reaction products of chloroplatinic acid with a monovalent alcohol, complexes of chloroplatinic acid with an olefin, platinum bisacetate, and the like.

In order to further improve the effects of the present invention, the amount of the base compound blended in the adhesive for fuel cells is preferably from 60% by mass to 90% by mass. In addition, the amount of the cross-linking agent blended in the adhesive for fuel cells is preferably from 2% by mass to 10% by mass.

The adhesion promoting agent included in the present invention is not particularly limited. By including the adhesion promoting agent, the adhesive force between the solid polymer electrolyte membrane and the adhesive layer can be strengthened through a chemical bond. The adhesion promoting agent preferably has a structure represented by the following general formula (3). By using an adhesion promoting agent having a structure represented by the following general formula (3), the adhesive force between the adhesive layer and the solid polymer electrolyte membrane can be further strengthened, whereby separation of the adhesive layer and the solid polymer electrolyte membrane during use can be prevented. It should be noted that, in order to improve the effect of the present invention, the amount of the adhesion promoting agent blended in the adhesive is preferably from 2% by mass to 4% by mass.

(3)

In the formula (3), X represents at least one group selected from the group consisting of a methoxy group, an ethoxy group, and a 2-methoxyethoxy group; Me represents a methyl group; R represents at least one group selected from the group consisting of an ethylene group and a propylene group; Y represents at least one group selected from the group consisting of an amino group, a vinyl group, a methacrylic group, an isocyanate group, a mercapto group, a ureido group and an epoxy group; and n is 0 or 1.

According to the adhesive for fuel cells including a base compound having a structure represented by the above general formula (1), a cross-linking agent having a structure represented by the above general formula (2), and an adhesion promoting agent having a structure represented by the above general formula (3), an adhesive layer having very high bond durability layer can be formed. By including the aforementioned base compound and the aforementioned cross-linking agent, the acid resistance of the adhesive layer formed is significantly elevated, and deterioration of the adhesive layer due to an acid eluded from the solid polymer electrolyte membrane can be sufficiently inhibited. In addition, by adjusting the ratio of moles of Si—H groups contained in the cross-linking agent relative to moles of alkenyl groups contained in the base compound to the range of 1.0 to 5.0, deterioration of the adhesive layer due to the crosslinking reaction and the like that may occur in the adhesive layer after the curing reaction can be sufficiently suppressed. Furthermore, owing to the aforementioned adhesion promoting agent, the solid polymer electrolyte membrane and the adhesive layer can be more strongly bonded via a chemical bond.

It is preferred that the adhesive for fuel cells of the present invention further includes a reaction inhibitor having two or more alkenyl groups per molecule. By including the aforementioned reaction inhibitor, even in the case of misalignment in lamination of the solid polymer electrolyte membrane and the gas diffusion layer, realignment can be easily carried out. As a result, manufacturing precision of the membrane-electrode assembly can be enhanced, and the occurrence of defects can be suppressed, and thus productivity of the membrane-electrode assembly is also improved.

As the reaction catalyst included in the adhesive for fuel cells of the present invention, any preferable catalyst can be appropriately used depending on type of the base compound, the cross-linking agent and the like. However, with respect to a curing reaction mechanism of the base compound and the cross-linking agent, a reaction system not generating a by-product is preferred. When a by-product is generated, voids may be produced in the adhesive layer after curing. Production of voids in the adhesive layer is not preferred since the force of the adhesive layer may be lowered. In the present invention, a platinum catalyst is preferable as described above.

The adhesive for fuel cells of the present invention may contain other components in an extent not detrimental to the effects of the invention. For example, addition of a filler can impart desired physical properties to the adhesive layer.

Preparation of Adhesive for Fuel Cells

The method of preparing the adhesive for fuel cells of the present invention is not particularly limited, and a conventionally well-known method of preparing an adhesive for fuel cells can be used. For example, the adhesive for fuel cells of the present invention may be prepared by kneading a base compound and a cross-linking agent, then kneading a filler, an adhesion promoting agent and the like therewith, and finally adding a reaction catalyst, a reaction inhibitor and the like thereto, and allowing for dispersion of each component while paying attention to the temperature so as not to allow an addition reaction to proceed excessively.

Membrane-Electrode Assembly

Figure 1:
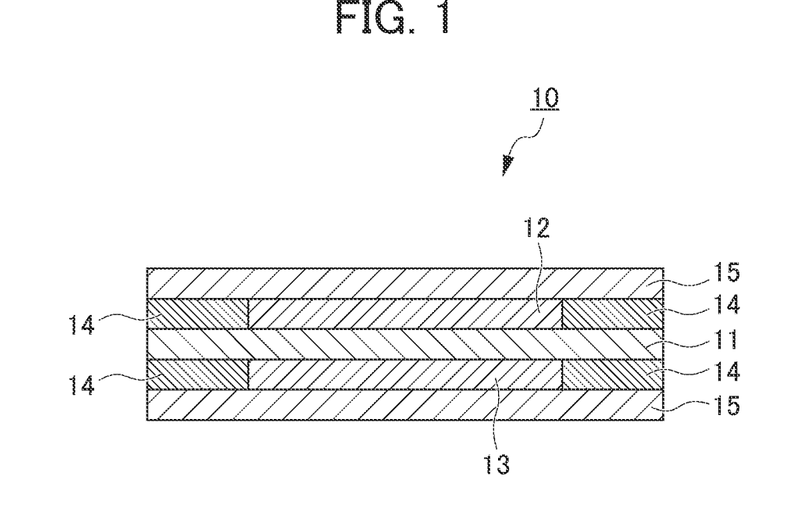
FIG. 1 shows a cross-sectional view illustrating a membrane-electrode assembly according to a first embodiment of the present invention.

A membrane-electrode assembly for solid polymer fuel cells of the present invention is explained with reference to drawings. FIG. 1 shows a cross-sectional view of a membrane-electrode assembly according to the first embodiment of the present invention. In a membrane-electrode assembly 10, a solid polymer electrolyte membrane 11, and a catalyst layer on an air electrode side 12 and a catalyst layer on a fuel electrode side 13 are provided so as to sandwich the solid polymer electrolyte membrane 11. Adhesive layers 14 and 14 are formed at a periphery of these catalyst layers 12 and 13. Furthermore, gas diffusion layers 15 are provided to sandwich these catalyst layers 12 and 13, and adhesive layers 14 and 14. As shown in FIG. 1, the solid polymer electrolyte membrane 11, the adhesive layers 14 and 14, and the gas diffusion layers 15 and 15 are constructed so that their end face positions match.

The solid polymer electrolyte membrane 11 is formed with a conventionally well-known polymer electrolyte. An exemplary conventionally well-known polymer electrolyte is a fluorine based polymer having a polymer skeleton at least partially fluorinated, or a hydrocarbon based polymer having a polymer skeleton not containing fluorine, but containing an ion exchange group, and the like. The type of the ion-exchange group is not particularly limited, and may be arbitrarily selected according to the intended use. In the present invention, for example, a polymer electrolyte having at least one ion-exchange group such as sulfonic acid, carboxylic acid and phosphonic acid may be used.

The catalyst layer on the air electrode side 12 and the catalyst layer on the fuel electrode side 13 are composed of an ion-conductive material, i.e., catalyst metal particles or an electrode catalyst including catalyst metal particles supported on an electrically conductive carrier, and may contain other components such as a carbon fiber, a dispersant, and a water repellent as needed.

The catalyst metal particle is not particularly limited so long as it has catalytic activity, and metal black consisting of precious metal fine particles themselves such as platinum black may be used.

The electrically conductive carrier for supporting the catalyst metal particles is not particularly limited so long as it has electrical conductivity and moderate corrosion resistance, and one including carbon as a principal component is preferably used since it has sufficient specific surface area for highly dispersing the catalyst metal particles, and has sufficient electron conductivity. It is necessary that the catalyst carrier that configures the electrode not only supports the catalyst metal particles, but also serves functions of a current collector for releasing electrons into an external circuit or extracting electrons from an external circuit. Higher electrical resistance of the catalyst carrier leads to elevation of the internal resistance of the cell and results in deterioration of performances of the cell. Therefore, the electron conductivity of the catalyst carrier contained in the electrode must be sufficiently high. Accordingly, any catalyst carrier may be used so long as it has sufficient electron conductivity as an electrode catalyst carrier, and a carbon material having evolved fine pores may be suitably used. As the carbon material having evolved fine pores, carbon black, activated charcoal or the like can be preferably used. Examples of the carbon black include channel black, furnace black, thermal black, acetylene black and the like. Moreover, the activated charcoal is obtained by subjecting a variety of materials containing carbon atoms to carbonization and activation treatments. In addition, a metal oxide, metal carbide, metal nitride or polymer compound having electron conductivity may be also included. It should be noted that the principal component referred to herein indicates a carbonaceous material contained in an amount of no less than 60%.

In addition, as the catalyst metal particle supported on the electrically conductive carrier, platinum or a platinum alloy may be used; however, when a platinum alloy is used, stability and activity as an electrode catalyst can be further imparted as well. As the platinum alloy, an alloy of platinum with at least one selected from the group consisting of metals of platinum group metals other than platinum (e.g., ruthenium, rhodium, palladium, osmium and iridium), cobalt, iron, titanium, gold, silver, chromium, manganese, molybdenum, tungsten, aluminum, silicon, rhenium, zinc and tin is preferred. Moreover, the platinum alloy may also contain an intermetallic compound of platinum with a metal for forming an alloy with platinum.

The catalyst that can be used for manufacturing the membrane-electrode assembly of the present invention may use a prepared catalyst, or use a commercially available product. In the case of the catalyst being prepared, the preparation method is not particularly limited, and a catalyst prepared according to a conventionally well-known preparation method may be used. The preparation method of a conventionally well-known catalyst is, for example, a method which includes preparing by: adding a solution or suspension of a platinum compound as a starting material to a carrier powder; evaporating to dryness; insolubilizing with an acid or alkali; and then carrying out a reduction treatment to activate a component supported, and the like.

The adhesive layer 14 is a layer that includes the above adhesive for fuel cells of the present invention. By using the adhesive for fuel cells of the present invention, the adhesiveness of the gas diffusion layers 15 and 15 with the solid polymer electrolyte membrane 11 is promoted. Promotion of the adhesiveness enables the solid polymer electrolyte membrane 11 to be maintained held at an appropriate position. In addition, the solid polymer electrolyte membrane 11 can be reinforced by supporting with the gas diffusion layers 15 and 15. As a result, handleability of the membrane-electrode assembly is improved. Furthermore, when the adhesive of the present invention contains a reaction inhibitor, a certain time period is required until curing of the adhesive for fuel cells is completed; therefore, if the alignment for adhering together the solid polymer electrolyte membrane 11 and gas diffusion layers 15 and 15 has shifted, realignment is possible, and thus a high quality membrane-electrode assembly can be manufactured with high productivity.

Moreover, by providing the adhesive layers 14 and 14 at a periphery of the catalyst layer, and allowing the adhesive layers 14 and 14 to surround the periphery of the catalyst layers 12 and 13, the adhesive layers 14 and 14 also have a sealing function of preventing the reaction gases from mixing. According to the adhesive layer employing the adhesive for fuel cells of the present invention, the adhesiveness of the gas diffusion layers 15 and 15 with the solid polymer electrolyte membrane 11 is very high as described above, whereby separation of the gas diffusion layers 15 and 15 from the solid polymer electrolyte membrane 11 can be prevented. As a result, the effect of this sealing function is improved.

The gas diffusion layer 15 may have a similar construction to that of conventionally well-known gas diffusion layers. Examples of a conventionally well-known gas diffusion layer include gas diffusion layers formed from a carbon Teflon (registered trademark) layer and a carbon paper layer being in contact with the carbon Teflon (registered trademark) layer, and the like. The carbon paper layer is a porous supporting layer, and a conventionally well-known carbon paper can be used. It should be noted that a carbon paper having a surface subjected to a water-repellent treatment may be used. The carbon Teflon (registered trademark) layer is a layer containing a granular water-repellent resin such as Teflon (registered trademark), and carbon particles. The gas diffusion layer is not limited to those having the aforementioned construction, and any gas diffusion layer on the fuel electrode side having a configuration that enables the hydrogen gas of the fuel to evenly reach the catalyst layer is acceptable. The gas diffusion layer on the air electrode side is acceptable when constructed such that the air containing oxygen gas can evenly reach the catalyst layer. Also, the gas diffusion layers on the fuel electrode side and on the air electrode side may have different configurations, or may have an identical configuration.

Alternatively, the adhesive layer 14 may be provided so as to surround either the periphery of the catalyst layer on the air electrode side 12 alone, or to surround the periphery of the catalyst layer on the fuel electrode side 13 alone. However, as shown in FIG. 1, it is preferred that the adhesive layers 14 and 14 be provided at a periphery of the catalyst layer on the air electrode side 12 and the catalyst layer on the fuel electrode side 13. By providing the adhesive layer 14 at a periphery of both catalyst layers, the solid polymer electrolyte membrane 11 can be strongly supported by the gas diffusion layers 15 and 15 on both sides, and adhesion durability of the gas diffusion layers 15 and 15 with the solid polymer electrolyte membrane 11 is elevated on both of the catalyst layer sides. Additionally, by sealing the periphery of both sides of the catalyst layer with the adhesive layers 14 and 14, mixing of the reaction gases can be further prevented.

Figure 2:
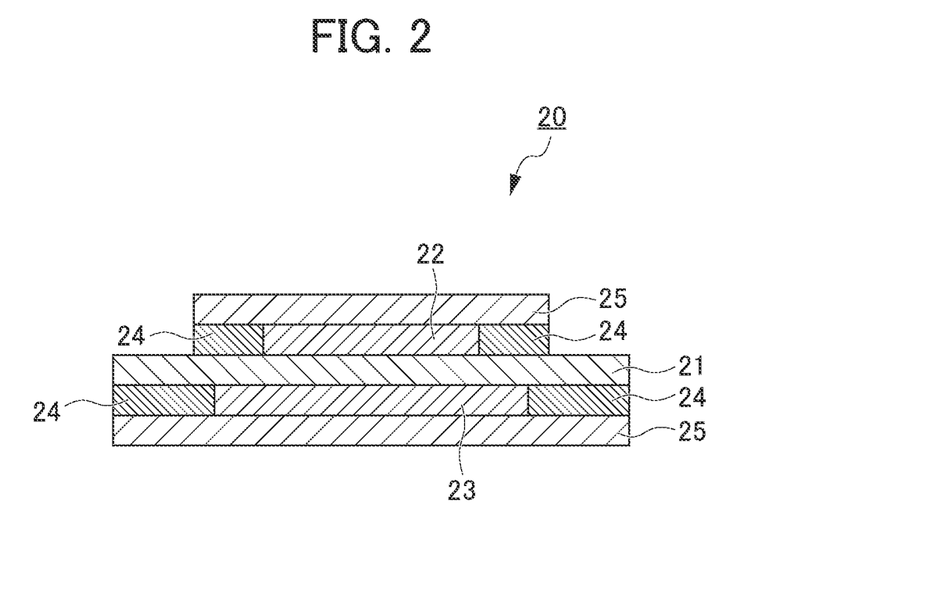
FIG. 2 shows a cross-sectional view illustrating a membrane-electrode assembly according to a second embodiment of the present invention.

Next, a membrane-electrode assembly according to the second embodiment of the present invention is explained. FIG. 2 shows a cross-sectional view illustrating a membrane-electrode assembly 20 according to the second embodiment of the present invention. In the following description, explanation of configurations corresponding to those in the first embodiment will be omitted appropriately.

The present embodiment is different from the first embodiment in that the dimensions of the catalyst layer on the air electrode side 22 and the catalyst layer on the fuel electrode side 23 are different, and that the dimensions of the gas diffusion layers 25 and 25 are also different between the fuel electrode side and the air electrode side. As a result of having such different dimensions of the catalyst layers and the like between the fuel electrode side and the air electrode side, one surface of the solid polymer electrolyte membrane 21 is exposed at the edge. Accordingly, the gas diffusion layers 25 and 25 are provided such that the end faces are spaced apart via the solid polymer electrolyte membrane 21. Therefore, mixing of the reaction gases is more likely to be prevented.

Production of Membrane-Electrode Assembly

The method of producing the membrane-electrode assembly of the present invention is not particularly limited, and the assembly may be produced by a conventionally well-known method. Various methods such as, for example, a method in which a catalyst layer and an adhesive layer are formed directly on a solid polymer electrolyte membrane and sandwiched with gas diffusion layers as needed, a method in which a catalyst layer and an adhesive layer are formed on a base material to be a gas diffusion layer such as carbon paper, which is joined to a solid polymer electrolyte membrane, and the like may be employed.

As a method of forming a catalyst layer, a well-known method may be employed in which a dispersion liquid is used including a catalyst to be supported and a perfluorocarbon polymer having a sulfonic group dispersed in a dispersion medium (to which a water repellent, a pore-forming agent, a thickening agent, a diluted solvent and the like are added if necessary) to permit formation on a solid polymer electrolyte membrane, a gas diffusion layer, or a flat plate.

The method of forming the adhesive layer is not particularly limited. As the method of forming the above, for example, blush coating, writing brush coating, bar coater coating, knife coater coating, doctor blade coating, screen printing, spray coating, and the like may be exemplified.

EXAMPLES

Hereinafter, the present invention is explained in more detail by way of Examples; however, the present invention is not limited to these Examples. Various measurement points in the Examples were determined as in the following.

Materials

SIFEL2660, manufactured by Shin-Etsu Chemical Co., Ltd. and including the base compound and the cross-linking agent described below, was used. Base compound: base compound having the following structure

(n=500 in Examples 1 to 5; n=750 in Examples 6 and 7; and n=1,000 in Examples 8 to 10)

Cross-linking agent: cross-linking agent having the following structure (x + y = 20)

Adhesion promoting agent: adhesion promoting agent having the following structure (3-glycidoxypropyltrimethoxysilane, "A-187" manufactured by Momentive Performance Materials Inc.)

Reaction catalyst: platinum black

Silicone rubber: dimethyl silicone rubber ("SE6746", manufactured by Dow Corning Toray Co., Ltd.)

Reaction inhibitor: tetravinyldimethyldisiloxane

Filler: fumed silica (having a specific surface area according to BET method of 150 to 400 m²/g)

Preparation of Adhesive for Fuel Cells

The materials shown in Table 1 and Table 2 were used at the blend ratios shown in Table 1 and Table 2. First, the base compound and the cross-linking agent were kneaded, then the filler and the adhesion promoting agent were kneaded therewith, and finally the reaction catalyst and the reaction inhibitor were added thereto. Then, each component was allowed to be dispersed.

Production of Solid Polymer Electrolyte Membrane

A solution was produced by dissolving in NMP (N-methyl-2-pyrrolidone) a sulfonated polymer represented by the following formula (4) having a polystyrene equivalent weight average molecular weight of 135,000 to give a concentration of 8% by mass. This solution was casted on a glass substrate and membrane formation was permitted such that the membrane thickness after drying was 40 μm.

(4)

Production of Catalyst Particles

Platinum particles were supported on carbon black (furnace black) having a mean diameter of 50 nm to give a carbon black:platinum mass ratio of 1:1.

Production of Catalyst Paste

As an ion-conductive material, a catalyst paste was prepared by uniformly dispersing the aforementioned catalyst particles in a solution of a perfluoroalkylenesulfonic acid polymer compound ("Nafion (registered trademark)", manufactured by Du Pont Kabushiki Kaisha) at an ion-conductive material:catalyst particles mass ratio of 8:5.

Production of Membrane Electrode Structure

Figure 3:
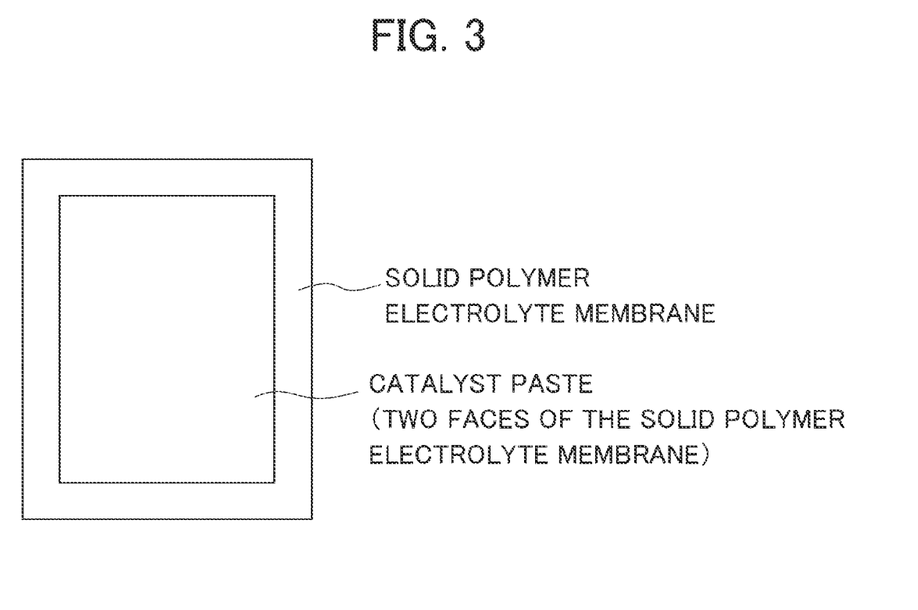
FIG. 3 shows a view illustrating a membrane electrode structure produced in the Examples.

The catalyst paste was coated on two faces of the solid polymer electrolyte membrane described above by bar coater coating to give a platinum content of 0.5 mg/cm², and dried to form a catalyst layer on the solid polymer electrolyte membrane, thereby producing the membrane electrode structure as shown in FIG. 3. The drying carried out included drying at 100° C. for 15 min, followed by secondary drying at 140° C. for 10 min.

Production of Gas Diffusion Layer

Figure 4:
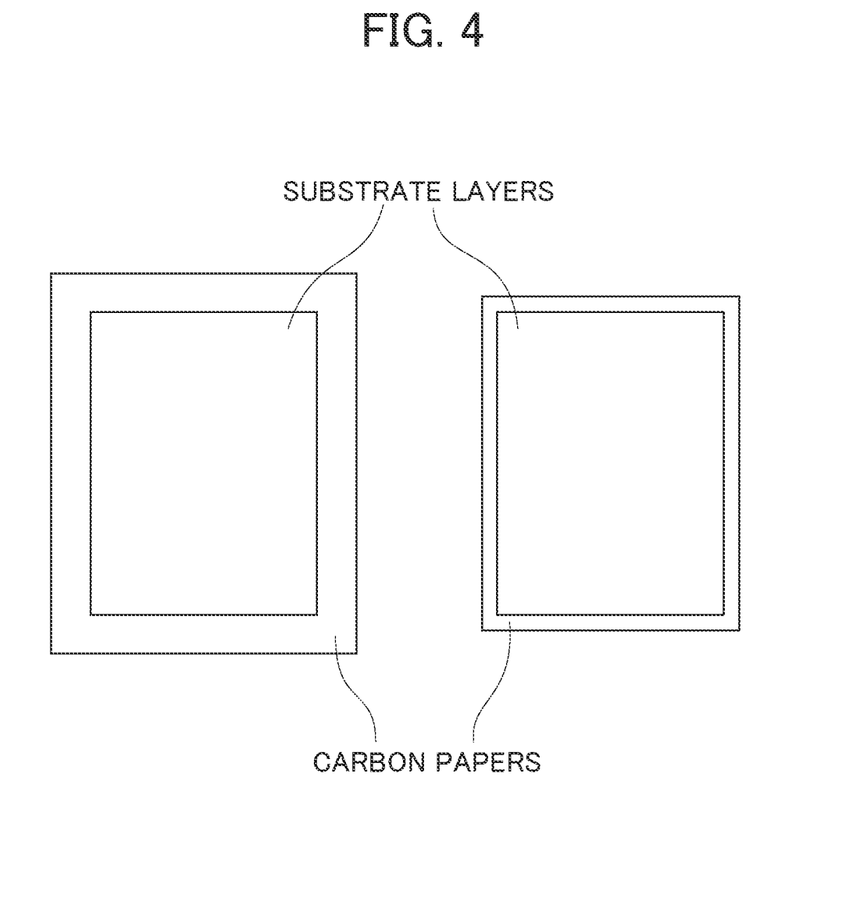
FIG. 4 shows a view illustrating a gas diffusion layer produced in the Examples.

Carbon black and polytetrafluoroethylene (PTFE) particles were mixed at a carbon black:PTFE mass ratio of 4:6, and the resulting mixture was uniformly dispersed in ethylene glycol to obtain a slurry. This slurry was coated and dried on one side of carbon papers having different sizes, respectively, to form substrate layers, whereby two gas diffusion layers having different dimensions as shown in FIG. 4 were produced.

Production of Membrane-Electrode Assembly

The aforementioned adhesive was coated on a portion of the periphery of the substrate layer where the carbon paper was exposed in the gas diffusion layer. Subsequently, lamination was performed in the order of the gas diffusion layer, the membrane electrode structure and the gas diffusion layer, Amount of Heat Required for Curing With regard to the adhesives for fuel cells of the Examples and Comparative Examples, products derived by multiplying the curing temperature by the time period required for curing were employed as a marker of the amount of heat required for curing. The results are shown in Table 1.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Base compound (% by mass) | 50 | 50 | 50 | 50 | 50 | — | — |
| Cross-linking agent (% by mass) | 3 | 3 | 3 | 3 | 3 | — | — |
| Reaction catalyst (ppm) | 4 | 4 | 4 | 4 | 4 | — | — |
| Moles of Si—H group/moles of alkenyl group | 1.0 | 1.2 | 5.0 | 0.8 | 6.0 | — | — |
| Silicone rubber | — | — | — | — | — | 57 | 57 |
| Filler (% by mass) | 7 | 7 | 7 | 7 | 7 | 7 | 7 |
| Reaction inhibitor (% by mass) | *slight amount | *slight amount | *slight amount | *slight amount | *slight amount | *slight amount | *slight amount |
| Adhesion promoting agent (% by mass) | 40 | 40 | 40 | 40 | 40 | 40 | None |
| Bond durability | A | A | A | B | B | B | B |
| Amount of heat required for curing | 150° C. × 2 hrs | 150° C. × 30 min | 150° C. × 30 min | 150° C. × 2 hrs | 150° C. × 30 min | 150° C. × 30 min | 150° C. × 30 min |

*"slight amount" representing an amount of no greater than 1% by mass followed by hot pressing to produce a membrane-electrode assembly as shown in FIG. 2. The hot pressing carried out included primary hot pressing at 80° C. and 5 MPa for 2 min, followed by secondary hot pressing at 160° C. and 4 MPa for 1 min.

Production of Fuel Cell

A solid polymer fuel cell can be constructed by further laminating separators that also serve as a gas passage on the gas diffusion layers of thus obtained membrane-electrode assembly.

Evaluation of Bond Durability

Tests on the electric-power generation of the fuel cells of Examples 1 to 3 and Comparative Examples 1 to 4 were conducted under the following conditions for 3,000 hrs. Thereafter, the fuel cells were disassembled to the membrane-electrode assembly and the separator, and joining of the gas diffusion layer with the solid polymer electrolyte membrane by the adhesive layer was visually confirmed. When the gas diffusion layer and the solid polymer electrolyte membrane were joined, the cell was rated as "A", and when the gas diffusion layer and the solid polymer electrolyte membrane were separated, the cell was rated as "B". The evaluation results are shown in Table 1.

Test Conditions

Electric current density: 1 A/cm² (electric current value with respect to the area of the membrane-electrode assembly electrode)

Gas supplied on fuel electrode side: hydrogen 100%, humidity 60%

Gas supplied on air electrode side: air, humidity 40%

Operation temperature: 70° C.

Operation time: cycle of 20 hrs operating, and 4 hrs stopped

As is clear from the results of Examples 1 to 3, and Comparative Examples 3 and 4 shown in Table 1, it was ascertained that, by employing the base compound having alkenyl groups and the cross-linking agent having Si—H groups, the adhesive layer constituted with the adhesive for fuel cells of the present invention has very high bond durability as compared with the adhesive for fuel cells conventionally used. Moreover, as is clear from the results of Examples 1 to 3, and Comparative Examples 1 and 2 shown in Table 1, it was ascertained that the adhesive layer constituted with the adhesive for fuel cells of the present invention exhibits very high bond durability, by adjusting the ratio of moles of Si—H groups contained in the cross-linking agent relative to moles of alkenyl groups contained in the base compound to the range of 1.0 to 5.0 as described above. Particularly in Examples 2 and 3, it was ascertained that the amount of heat required for curing could be decreased, and effects on the solid polymer electrolyte membrane could be lowered.

DESCRIPTION OF REFERENCE NUMERALS AND SIGNS

10 Membrane-electrode assembly
11 Solid polymer electrolyte membrane
12 Catalyst layer on air electrode side
13 Catalyst layer on fuel electrode side
14 Adhesive layer
15 Gas diffusion layer

What is claimed is:

1. An adhesive for fuel cells used in producing a membrane-electrode assembly of a fuel cell, the adhesive comprising:
    a base compound having a structure represented by the following general formula (1); a cross-linking agent having a structure represented by the following general formula (2); an adhesion promoting agent; and a reaction catalyst,
wherein a ratio of moles of Si—H groups contained in the cross-linking agent relative to moles of alkenyl groups contained in the base compound (moles of Si—H group/moles of alkenyl group) is 1.0 to 5.0, (1)

wherein n represents an integer of 20 to 900; and (2)

wherein x and y satisfy $10 \leq x+y \leq 900$.

2. The adhesive for fuel cells according to claim 1, wherein the adhesion promoting agent has a structure represented by the following general formula (3), (3)

wherein X represents at least one group selected from the group consisting of a methoxy group, an ethoxy group, and a 2-methoxyethoxy group; Me represents a methyl group; R represents at least one group selected from the group consisting of an ethylene group and a propylene group; Y represents at least one group selected from the group consisting of an amino group, a vinyl group, a methacrylic group, an isocyanate group, a mercapto group, a ureido group and an epoxy group; and n is 0 or 1.

3. The adhesive for fuel cells according to claim 1, wherein the ratio of moles of Si—H groups contained in the cross-linking agent relative to moles of alkenyl groups contained in the base compound (moles of Si—H group/moles of alkenyl group) is 1.2 to 5.0.

4. A membrane-electrode assembly for a solid-polymer fuel cell, the assembly comprising:
a solid polymer electrolyte membrane;
a catalyst layer provided on at least one surface of the solid polymer electrolyte membrane;
a gas diffusion layer provided on the catalyst layer; and
an adhesive layer provided at a periphery of the catalyst layer, and joining the solid polymer electrolyte membrane and the gas diffusion layer,
wherein the adhesive layer contains the adhesive for fuel cells according to claim 1.

5. The adhesive for fuel cells according to claim 1,
wherein the membrane electrode assembly includes a solid polymer electrolyte membrane and a gas diffusion layer, and
wherein the adhesive for fuel cells adheres the solid polymer electrolyte membrane and the gas diffusion layer.

6. The adhesive for fuel cells according to claim 2,
wherein the membrane electrode assembly includes a solid polymer electrolyte membrane and a gas diffusion layer, and
wherein the adhesive for fuel cells adheres the solid polymer electrolyte membrane and the gas diffusion layer.

7. The adhesive for fuel cells according to claim 3,
wherein the membrane electrode assembly includes a solid polymer electrolyte membrane and a gas diffusion layer, and
wherein the adhesive for fuel cells adheres the solid polymer electrolyte membrane and the gas diffusion layer.

* * * * *